United States Patent [19]

Hodgkinson

[11] 4,131,222

[45] Dec. 26, 1978

[54] SNAPPING OF SHEETS OF GLASS

[75] Inventor: Joseph B. Hodgkinson, Billinge, Near Wigan, England

[73] Assignee: Pilkington Brothers Limited, St. Helens, England

[21] Appl. No.: 834,924

[22] Filed: Sep. 20, 1977

[51] Int. Cl.² .............................................. C03B 33/02
[52] U.S. Cl. ............................................ 225/3; 225/2; 225/96.5; 225/99
[58] Field of Search .................... 225/3, 2, 93, 96.5, 225/99, 103

[56] References Cited

U.S. PATENT DOCUMENTS

| | | | |
|---|---|---|---|
| 1,771,734 | 7/1930 | Peuley | 225/3 X |
| 3,268,135 | 8/1966 | Smith | 225/96.5 X |
| 3,491,634 | 1/1970 | Tomshany | 225/96.5 X |
| 3,658,220 | 4/1972 | Norton | 225/3 X |

*Primary Examiner*—Frank T. Yost
*Attorney, Agent, or Firm*—Sughrue, Rothwell, Mion, Zinn and Macpeak

[57] ABSTRACT

Glass snapping apparatus comprises a plurality of conveyors diverging away from each other in the direction of advance, lifting means for raising the trailing edge of the sheet above the leading edge and for imposing on the trailing edge a bending moment sufficient to snap the sheet along any score line parallel to the direction of advance of the sheet.

12 Claims, 4 Drawing Figures

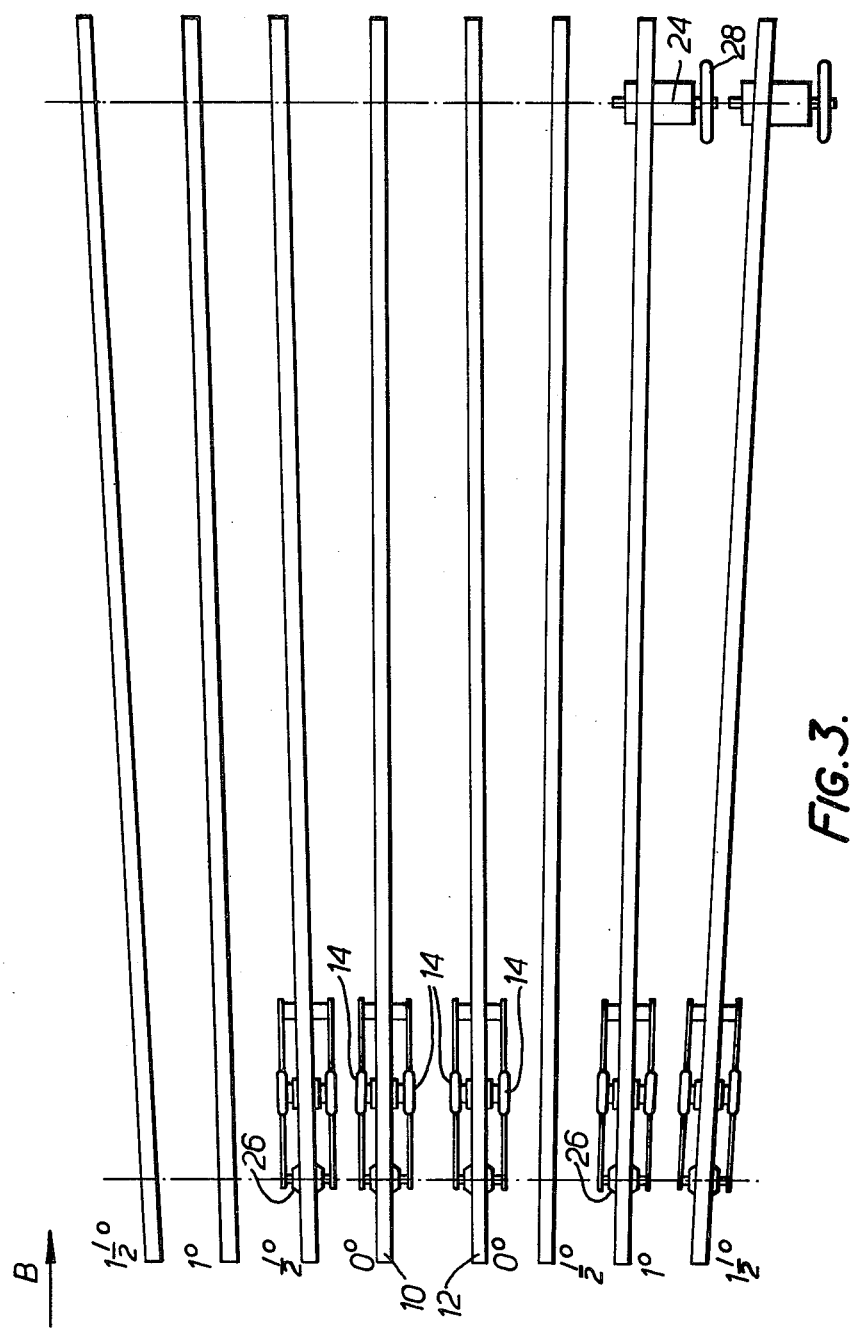

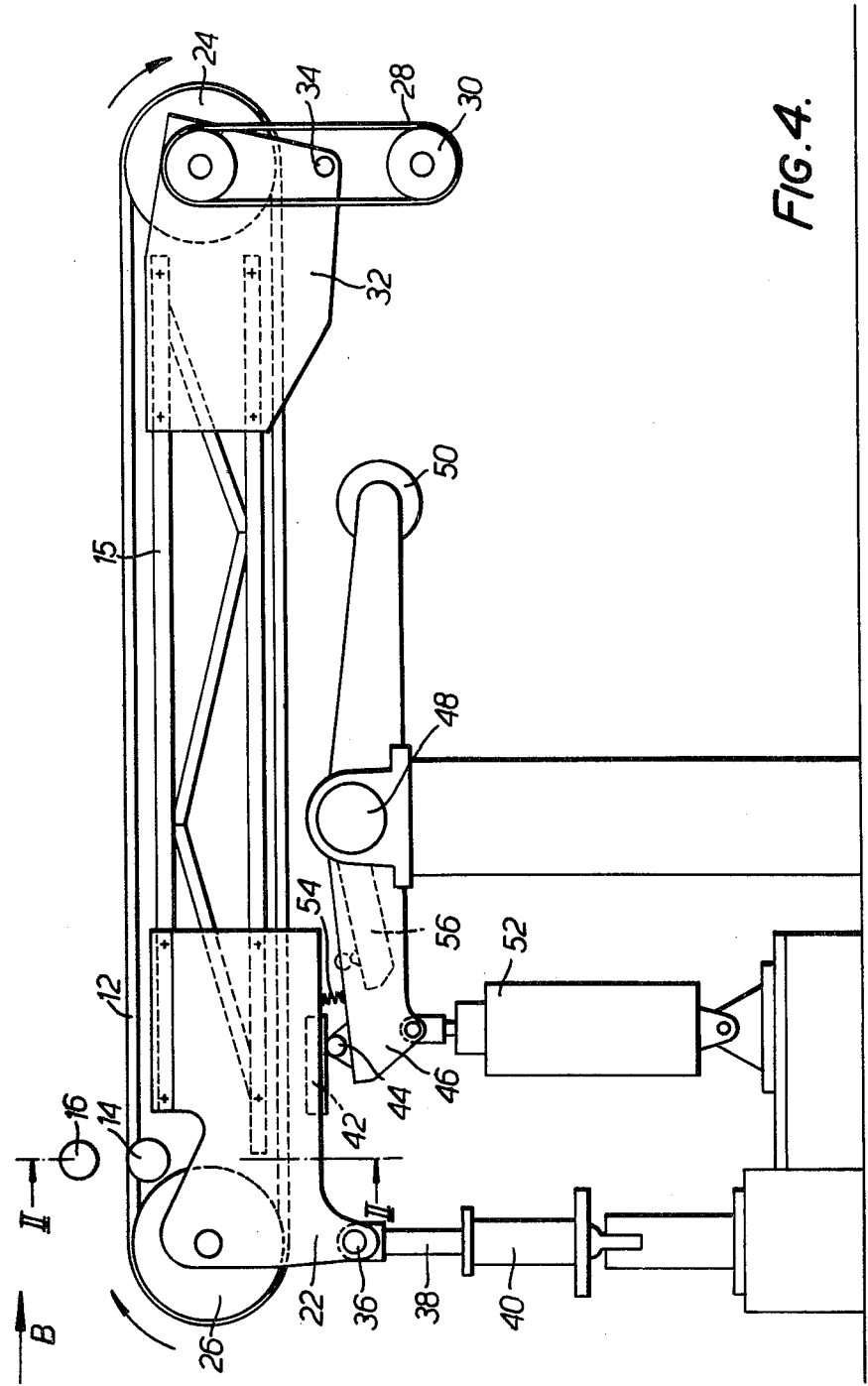

SNAPPING OF SHEETS OF GLASS

BACKGROUND OF THE INVENTION

The invention relates to the snapping of sheets of glass and in particular to a method of and apparatus for snapping a sheet of glass having a score line extending along the sheet.

U.K. Pat. No. 1,110,764 describes a method of snapping a sheet of glass having a score line extending along the sheet, which method is characterised by applying to opposite faces of the sheet uniformly curved bending members of complementary form which members extend across the sheet and each comprise a plurality of contacting elements, to impose on the sheet a curvature which is sufficient to snap the sheet along any score line parallel to the axis of the curvature but is insufficient to break any unscored area of the sheet. In this known method, the snapped portions of the sheet are usually conveyed along a common conveyor in spaced relationship to one another. The separated snapped portions are subsequently stacked on to pallets.

SUMMARY OF THE INVENTION

According to the present invention there is provided a method of snapping a sheet of glass having at least one score line extending along the sheet and separating the snapped portions by a predetermined amount, comprising advancing at least the leading edge of the sheet over conveying means, exerting on at least the leading edge of the sheet a plurality of forces diverging away from one another in the direction of advance, raising the trailing edge of the sheet above the leading edge and imposing on the sheet at its trailing edge a bending moment about its direction of advance which is sufficient to snap the sheet along any score line parallel to the direction of advance but is insufficient to break any unscored area of the sheet, and continuing to advance the snapped portions of the sheet so formed over the conveying means while maintaining the diverging forces, thereby effecting a lateral separation between the snapped portions of the sheet.

The present invention also provides an apparatus for snapping a sheet of glass along a score line extending along the sheet, comprising conveyor means arranged to exert on a conveyed sheet a plurality of forces diverging away from one another along the direction of advance, means for raising the trailing edge of the sheet above the leading edge and for imposing on the sheet at its trailing edge a bending moment about its direction of advance whilst the sheet is passing over the conveyor means, the bending moment being sufficient to snap the sheet along any score line parallel to the direction of advance but insufficient to break any unscored area of the sheet.

Preferably the conveyor means comprises a plurality of conveyors diverging away from one another along the direction of advance.

The imposition of the bending moment on the trailing edge of the sheet has been found to give a more precise and cleaner break than bending at another portion of the sheet. Also the use of the diverging conveyors in conjunction with snapping by bending at the trailing edge results in a more precise and reproducible positioning of the separated snapped portions of the sheet.

Preferably the bending moment is produced by imposing a curvature on the trailing edge of the sheet by pressing the trailing edge of the sheet between raised ends of the diverging conveyors and an overhead contacting member having a complementary shape to the imposed curvature. Alternatively the overhead contacting member could be of variable shape and arranged to adapt itself to the shape formed by the ends of the diverging conveyors, both when in their lowered and when in their raised positions. The overhead contacting member may comprise a set of rollers, either freely rotatable or driven at the forward speed of the glass sheets, disposed in a curved line and adjustably mounted to allow the curvature of the overhead contacting member to be altered.

Advantageously, two freely rotatable rollers are positioned on opposite sides of, and at the same level as, the upstream end of each conveyor. These rollers are lifted together with the upstream end of the conveyor and serve as additional support beneath the moving sheet as it is lifted into engagement with the overhead contacting member. The additional support provided by the rollers is particularly important when the score line is located over the gap between adjacent conveyors. In the latter instance the additional support rollers prevent vertical relative movement or shearing between snapped portions of the glass at the moment of snapping. The overall effect of the additional support beneath the glass is to allow the glass sheet to adopt a more uniform curvature when it is sandwiched between the overhead supporting member and the conveyors.

Advantageously sensing means are provided for detecting when the trailing edge of the sheet is over the upstream ends of the conveyors, and means are provided, responsive to the sensing means, for raising the upstream ends of the conveyors and the additional supporting rollers relative to the downstream ends of the conveyors. The means for raising the upstream ends of the conveyors and the additional supporting rollers may take the form of a series of spaced torque arms, rigidly attached to a transverse torque shaft. Each of the torque arms has a defined length and its end remote from the torque shaft can cooperate with a respective conveyor and pair of supporting rollers to raise them a predetermined vertical distance. The rotation of the torque shaft can be effected either by a motor or by an hydraulically or pneumatically operated piston and cylinder assembly, the piston being connected to one or more of the torque arms. Alternatively the raising and lowering of the upstream ends of the conveyors and supporting rollers can be effected by a plurality of spaced eccentric cams mounted on the rotatable torque arm, each cam being associated with a respective conveyor and pair of supporting rollers.

BRIEF DESCRIPTION OF THE DRAWINGS

FIG. 3 is an enlarged plan view of the diverging conveyors, and FIG. 4 is a side view of one of the conveyors and a lifting mechanism.

DESCRIPTION OF THE PREFERRED EMBODIMENT

Figure 1:
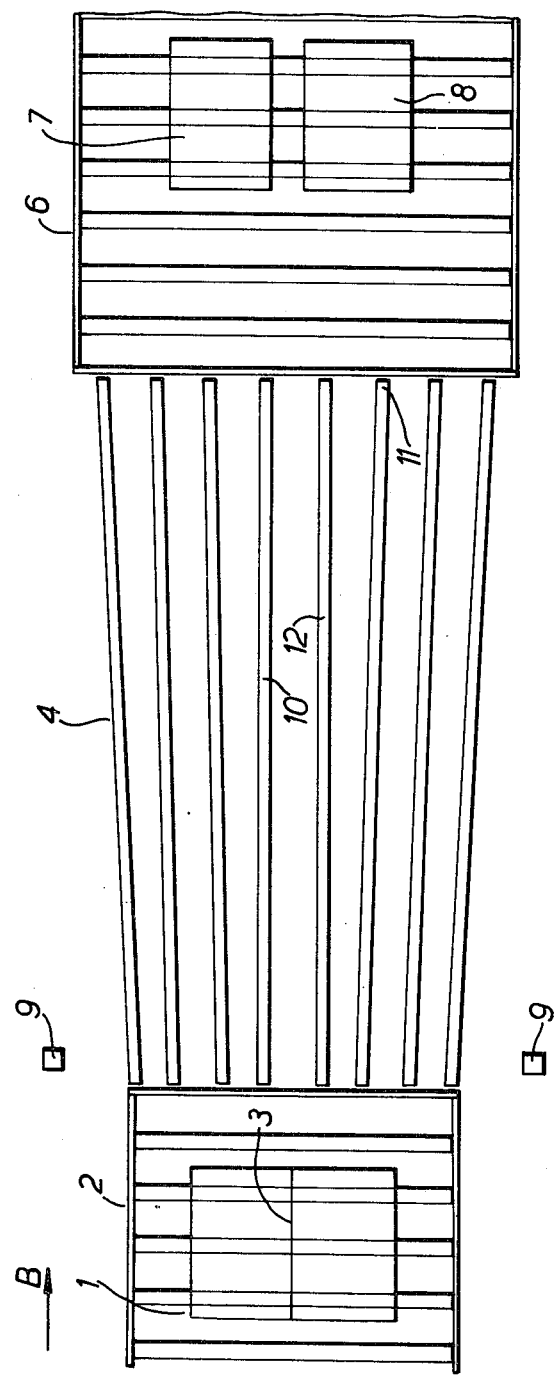
FIG. 1 is a schematic plan view of an apparatus constituting an embodiment of the present invention installed in a conveyor line having diverging conveyors.

Referring to FIG. 1, a portion of a conveyor line consists of upstream and downstream roller conveyors 2, 6 between which is a set 4 of diverging belt conveyors. The diverging belt conveyors are in the form of ten endless flexible belts (e.g. V-belts shown in FIG. 2). The two central belt conveyors 10,12 are parallel to one another and to the direction of advance, but the outer belt conveyors diverge away from one another along their direction of advance, the angles between adjacent conveyors being equal. Although only ten flexible belts are illustrated in FIG. 1, the number of diverging conveyors can be more or less, dependent on the size of glass sheets to be snapped.

In operation, a sheet of glass 1 having a longitudinal score line 3 is conveyed from the upstream conveyor 2 on to the set 4 of diverging conveyors. The glass sheet 1 is then sensed by a sensor 9 and snapped along the score line in a manner to be described later, and two snapped portions 7,8 are formed. The two snapped portions are separated on the diverging conveyors and proceed along parallel paths on the downstream conveyor 6.

Figure 2:
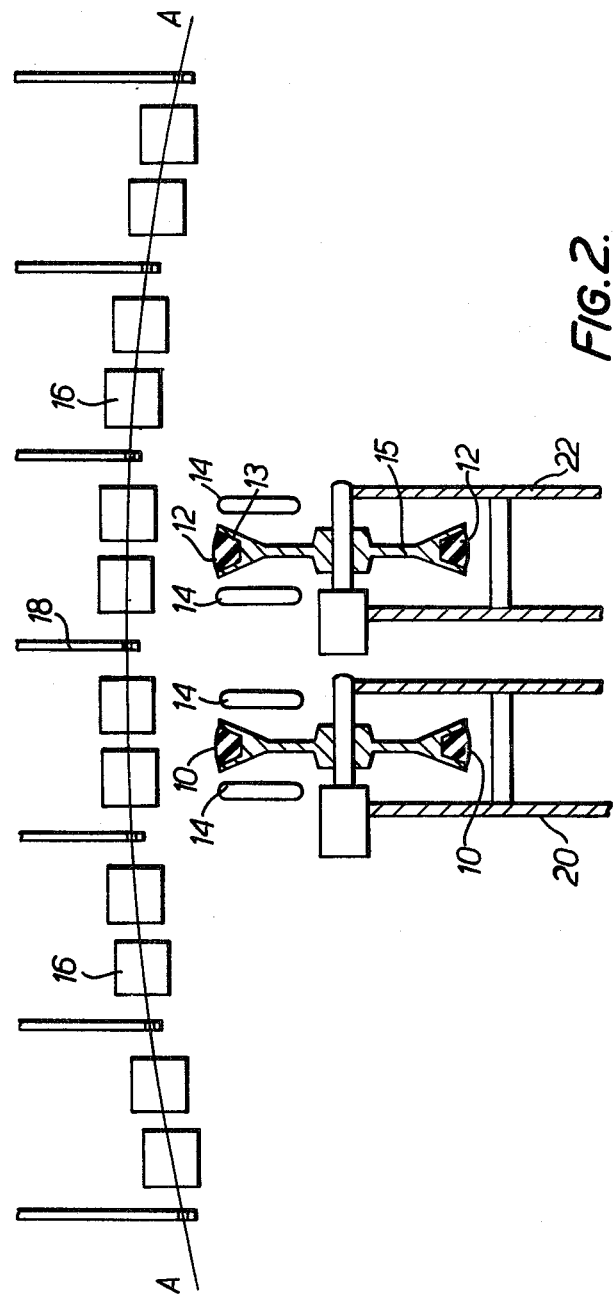
FIG. 2 is a section through the leading portion of the diverging conveyors taken along the line II—II of FIG. 4.

FIG. 2 shows a section through the upstream portions of two of the endless V-belt conveyors 10,12 of FIG. 1, the V-belts 10,12 being located on opposite sides of the centre line through the set 4 of diverging conveyors. On each side of each V-belt is located a rubber roller 14 so that two rollers 14 are associated with each V-belt. The V-belts and their associated roller pairs are mounted on, and for vertical movement with, respective supporting frameworks generally indicated by numerals 20,22. The roller pairs 14 and the upstream portions of the V-belts can be raised or lowered with their respective supporting frameworks in a manner to be described below with reference to FIGS. 3 and 4.

Above the V-belts is an overhead contacting member comprising a set of driven or freely rotatable rollers 16 adjustably mounted on supports 18, on a curved line A—A.

Referring to FIG. 4, the endless V-belt conveyor 12 passes around a drive wheel 24 and a free wheel 26 and moves along a V-shaped channel 13 defined by the periphery of a supporting structure 15 (FIG. 2). The drive wheel 24 and an end portion of the supporting structure 15 are attached to a framework 32 which is pivotally mounted to a fixed point 34. The drive wheel 24 is rotated by a belt 28 which is itself driven by a pulley 30 on a drive shaft of a motor (not shown).

The free wheel 26 and the other end portion of the supporting structure 15 are attached to the vertically movable supporting framework 22.

A downward projection on the supporting framework 22 is rigidly fixed at a point 36 to the end of a vertical rod 38 which is arranged to reciprocate in a vertically disposed guide member 40 which fits closely around it. The rod 38 and guide member 40 serve as a guidance system to maintain the belt conveyor 12 in a vertical plane when the end of the belt conveyor 12 is raised and lowered.

The supporting framework 22 cooperates by means of a thrust pad 42 with a roller 44. The roller 44 is mounted on a torque arm 46 which is supported on a transverse torque shaft 48, the weight of the torque arm being balanced by a weight 50. A downward projection on the end portion of the torque arm 46 is connected to a lifting piston and cylinder assembly 52. The top of the torque arm 46 is connected to the undersurface of the supporting framework 22 by a spring 54 which biasses the torque arm away from the supporting framework 22.

Torque arms of different lengths are arranged to cooperate with the different diverging belt conveyors, to impart differing heights of lift for a given movement of the torque shaft 48. Thus FIG. 4 shows in chain lines a torque arm 56 which is smaller in overall dimensions than the torque arm 46. The torque arm 56 cooperates with another belt conveyor, for example belt conveyor 11 in FIG. 1, in an analogous manner to that described for torque arm 44.

In operation, a sheet of glass having at least one score line 3 along its length is advanced along direction B over the diverging conveyors until its trailing edge is about to pass between the rollers 16 and 14. The trailing edge is sensed by the sensor 9 which transmits a signal to actuate an hydraulic or pneumatic system (not shown) operably connected to the piston and cylinder assembly 52. The piston of the assembly 52 is forced upwardly and effects clockwise rotation of the torque arm 46. Rotation of the torque arm 46 effects rotation of the torque shaft 48 which in turn effects simultaneous clockwise rotation of all the torque arms attached in spaced relationship to the torque shaft 48 along its length. The roller 44 mounted on the top of each torque arm abuts upwardly against the respective supporting framework (such as 22) attached to the upstream portion of the respective diverging belt conveyor. In this way the upstream portion of each belt conveyor is raised relative to the trailing end of the conveyor which pivots about point 34. Each conveyor is maintained in its vertical plane during lifting by means of the respective guidance system constituted by rod 38 and guide member 40, and the height to which each belt conveyor is lifted is dependent on the dimensions of the respective torque arm and the angle at which it is mounted on the torque shaft. The height is preset to bring the top of the trailing edge of the sheet of glass into engagement with the rollers 16. Each pair of rollers 14 being mounted on the respective supporting framework 20,22, is lifted through the same height as the upstream end of the respective conveyor. In this manner the upstream portions of the diverging conveyors are pivoted upwardly and the ends of the conveyors present a transverse curvature complementary to that of the set of rollers 16. By imposing the curvature on the trailing edge of the glass sheet as it is advancing over the diverging conveyors between the rollers 16 and the rollers 14, a bending moment is created about the score line 3. The size of the bending moment is dependent on the curvature imposed on the sheet, the curvature being adjusted so that the sheet is snapped along the score line but not along any unscored area of the sheet. After the score line has been snapped the piston and cylinder assemblies 52 lower the diverging conveyors. As a safety device, each spring 54 first urges the torque arm away from the framework 22 and then goes into tension to aid the retraction of the torque arm and lowering of the belt conveyors before the next glass sheet arrives.

Other means than a piston and cylinder assembly can be used to raise the diverging belt conveyors. For example, the torque shaft can have a number of eccentric cams or linkages mounted along its length, each cam or linkage cooperating with a respective belt conveyor to raise and lower them.

The angle of inclination, in a horizontal plane, between each diverging belt conveyor and the direction of advance determines the extent to which the snapped portions of the glass sheet are separated. In FIG. 3, the central pair of conveyors 10,12 are parallel, but on each side of this pair the angles of inclination between adjacent conveyors vary in ½° steps. However, the angles of inclination between adjacent conveyors can be set to vary at angles less than or greater than ½°.

In a typical system, 22 diverging belt conveyors are employed, 11 conveyors on each side of the centre line and having angles of inclination between adjacent conveyors of ½°. The set of rollers 16 are set at a fixed radius of curvature of 516 inches and the torque arms each have varying radii so that the ends of the diverging conveyors, when raised, lie on a curve having a radius of curvature of 516 inches.

An advantage of the diverging conveyors is that opposing transverse forces are applied to each portion of the sheet at the moment of snapping. The opposing forces apply a tensional force across the score line in the plane of the glass sheet and separate the snapped portions as soon as they are formed. It is for this reason that the belts are located in grooves. In this manner the snapping of the glass sheet is assisted and shear forces between the opposing faces of the snapped portions are reduced. Likewise adjacent sheets are prevented from damaging one another by mutual contact.

A further advantage is that the snapped portions of the glass sheet can be moved into precise defined positions on the downstream conveyor 6, in correctly squared relationship thereto, i.e. with their side edges parallel to, and their leading and trailing edges perpendicular to, the centre line of the conveyor system; whereas a previous system of using skewed rollers to separate snapped portions of the glass sheet tended to result in unpredictable positioning of the snapped portions. In addition, because only one end of the device is actuated, the cycle time between each glass sheet passing along the conveyor line can be reduced to a low figure, e.g. approximately 1 second.

It is to be understood that, although the above description describes the imposition of a uniform transverse curvature on the glass sheet for snapping it, the invention also covers the concept of using non-uniform curvatures.

It will further be understood that, although the specific embodiment of apparatus is shown and described above as acting on a sheet having a single score line along its length to form two snapped portions, the apparatus can act on sheets each having a plurality of longitudinal score lines, for example having two score lines to form three snapped portions or three score lines to form four snapped portions.

It will be appreciated that it is advantageous to drive the downstream wheel 24 of the conveyor 12 (as described above) rather than the upstream wheel 26 as this simplifies the engineering in avoiding the need for drive means in the region of the upstream end of the conveyor where the lifting mechanism is located. It will further be appreciated that instead of providing a separate drive belt 28 for the wheel 24 as shown and described, the drive to this wheel could if desired be transmitted by the conveyor belt 12 itself, the belt 12 being lengthened and arranged to pass from the wheel 24 round the drive pulley 30 and then over a suitable tensioning device at a position along its return run to the upstream wheel 26.

Yet further it will be appreciated that instead of providing torque arms of different lengths as described above and as illustrated by the torque arms 46 and 56 in FIG. 4, the torque arms could all be of the same length (for purposes of ease of manufacture) and the respective rollers 44 would then be mounted at different positions along the torque arms, i.e. at different distances from the torque shafts 48, so as to provide the differing heights of lift of the upstream ends of the respective belt conveyors required to achieve the desired transverse curvature. It will also be appreciated that the arrangement of a roller 44 which acts against a thrust pad 42 as shown and described could, if desired, be replaced by a suitable pivoted linkage between the framework 22 and the torque arm 46.

In some embodiments the rollers 14 shown in FIG. 2 may be omitted.

I claim:

1. A method of snapping a sheet of glass having at least one score line extending along the sheet and separating the snapped portions by a predetermined amount, comprising advancing at least the leading edge of the sheet over conveying means, exerting on at least the leading edge of the sheet a plurality of forces diverging away from one another in the direction of advance, raising the trailing edge of the sheet above the leading edge and imposing on the sheet at its trailing edge a bending moment about its direction of advance which is sufficient to snap the sheet along any score line parallel to the direction of advance but is insufficient to break any unscored area of the sheet, and continuing to advance the snapped portions of the sheet so formed over the conveying means while maintaining the diverging forces, thereby effecting a lateral separation between the snapped portions of the sheet.

2. A method according to claim 1 wherein the plurality of diverging forces are applied to the glass sheet by conveying the sheet on a plurality of conveyors which diverge away from each other in the direction of advance.

3. A method according to claim 2 wherein the bending moment is produced by imposing a curvature on the trailing edge of the sheet by pressing the trailing edge of the sheet between the raised ends of the diverging conveyors and an overhead contacting member having a complementary shape to the imposed curvature.

4. Apparatus for snapping a sheet of glass along a score line extending along the sheet, comprising conveyor means arranged to exert on a conveyed sheet a plurality of forces diverging away from one another along the direction of advance, means for raising the trailing edge of the sheet above the leading edge and for imposing on the sheet at its trailing edge a bending moment about its direction of advance whilst the sheet is passing over the conveyor means, the bending moment being sufficient to snap the sheet along any score line parallel to the direction of advance but insufficient to break any unscored area of the sheet.

5. Apparatus according to claim 4 wherein the conveyor means comprises a plurality of conveyors diverging away from one another along the direction of advance.

6. Apparatus according to claim 5 wherein means is provided for pressing the trailing edge of the sheet between raised ends of the diverging conveyors and an overhead contacting member having a complementary shape to the imposed curvature.

7. Apparatus according to claim 6 wherein the overhead contacting member comprises a set of rollers disposed in a curved line.

8. Apparatus according to claim 6 wherein the overhead contacting member is of adjustable shape.

9. Apparatus according to claim 5 wherein rollers are positioned on opposite sides of, and at the same level as, the upstream end of each conveyor.

10. Apparatus according to claim 9 wherein means is provided for lifting the rollers adjacent the upstream end of each conveyor so that the rollers are lifted together with the upstream end of the conveyor and serve as additional support beneath the moving sheet as it is lifted into engagement with the overhead contacting member.

11. Apparatus according to claim 10 wherein sensing means are provided for detecting when the trailing edge of the sheet is over the upstream ends of the conveyors, and means are provided, responsive to the sensing means, for raising the upstream ends of the conveyors.

12. Apparatus according to claim 11 wherein the means for raising the upstream ends of the conveyors and the additional supporting rollers comprise a series of spaced torque arms, rigidly attached to a transverse torque shaft.

* * * * *

UNITED STATES PATENT AND TRADEMARK OFFICE
CERTIFICATE OF CORRECTION

PATENT NO. : 4,131,222

DATED : December 26, 1978

INVENTOR(S) : Joseph B. HODGKINSON

It is certified that error appears in the above-identified patent and that said Letters Patent are hereby corrected as shown below:

IN THE HEADING:

Foreign Application Priority Data:

Insert -- Sep. 21, 1976     United Kingdom     39119/76 --.

Signed and Sealed this

Twenty-ninth Day of May 1979

[SEAL]

Attest:

RUTH C. MASON
*Attesting Officer*

DONALD W. BANNER
*Commissioner of Patents and Trademarks*